United States Patent [19]

Faulkner

[11] 4,043,119
[45] Aug. 23, 1977

[54] ACCELERATION AND SPEED CONTROL CIRCUIT FOR JET ENGINE ACCESSORY EQUIPMENT

[75] Inventor: Dennis T. Faulkner, Rockford, Ill.

[73] Assignee: Sundstrand Corporation, Rockford, Ill.

[21] Appl. No.: 660,198

[22] Filed: Feb. 20, 1976

[51] Int. Cl.² .......................... F02C 7/26; F02C 7/32
[52] U.S. Cl. .................................. 60/39.14; 60/39.33
[58] Field of Search ............ 60/39.14, 39.15, 39.16 S, 60/39.33; 74/7 C; 192/103 C

[56] References Cited

U.S. PATENT DOCUMENTS

| 2,652,685 | 9/1953 | Willgoos | 60/39.14 |
|---|---|---|---|
| 3,290,963 | 12/1966 | Oldfield et al. | 60/39.14 |
| 3,307,427 | 3/1967 | Turner | 60/39.14 |
| 3,578,120 | 5/1971 | Hilpert | 192/103 C |
| 3,752,284 | 8/1973 | Brittain et al. | 192/103 C |

Primary Examiner—Carlton R. Croyle
Assistant Examiner—Louis J. Casaregola
Attorney, Agent, or Firm—Ted E. Killingsworth; William R. Peoples; Michael B. McMurry

[57] ABSTRACT

In order to limit the acceleration and speed of jet engine accessory equipment when a jet fuel starter is being utilized as a power source to drive the accessory equipment when the main jet engines are disconnected from the jet fuel starter, an acceleration and speed control circuit is provided to control a starter clutch that connects the jet fuel starter to the accessory equipment. The acceleration and speed control circuit compares a signal representing a predetermined maximum acceleration and speed with a signal that represents the rate of rotation of the accessory equipment and generates signals to regulate a control valve which in turn controls the starter clutch.

21 Claims, 7 Drawing Figures

ACCELERATION AND SPEED CONTROL CIRCUIT FOR JET ENGINE ACCESSORY EQUIPMENT

BACKGROUND OF THE INVENTION

The invention relates to the field of electronic control of rotating equipment and more particularly, to the limitation of acceleration and speed of jet engine accessory equipment when the necessary equipment is connected to a jet fuel starter system.

In the operation and maintenance of turbo jet aircraft, it is frequently advantageous to have a source of power for operating the aircraft's electrical systems while the aircraft is on the ground. This normally requires an auxiliary power source which, as separate equipment, is usually quite expensive or, in the case of military aircraft operating from advanced bases, may be awkward to provide, or even unavailable altogether. It is therefore considered highly desirable for many types of aircraft to provide a source of electrical power without the need for additional ground equipment. One approach is to utilize the aircraft's jet fuel starter, which is normally used to start the aircraft's main jet engines, to power the aircraft's accessories, including the generators. However, one drawback to this approach results from the fact that when the jet engines are disconnected from the jet fuel starter, the jet fuel starter will cause the accessories, including the generators, to accelerate at a very high rate, thus potentially causing damage to the accessory equipment. For example, constant speed drives, which are used to connect the aircraft generators to mechanical power sources such as the jet engines or the jet fuel starter, are hydro-mechanical in nature and as such are especially susceptible to damage from high acceleration rates. During a normal jet engine start operation, when the engine is connected to the jet fuel starter, the inertia of the engine will serve to reduce the acceleration rate applied to both the engine and the accessory equipment, thereby naturally maintaining the acceleration rates within desired limits. It is only when the jet engine is disconnected from the jet fuel starter that acceleration rates become excessive.

SUMMARY OF THE INVENTION

It is therefore an object of the invention to provide an electronic circuit for controlling the rate of acceleration and the speed of jet engine accessory equipment connected to a jet fuel starter when its associated jet engine has been disconnected from the jet fuel starter.

It is a further object of the invention to provide an electronic acceleration and speed control circuit for limiting the acceleration and speed of jet engine accessory equipment when the jet engine is disconnected from a jet fuel starter wherein the electronic control circuit compares the rate of rotation of the accessory equipment to a signal which represents predetermined acceleration and speed limits.

It is an additional object of the invention to provide an electronic acceleration and speed control circuit for use with a jet fuel starter and jet engine accessory equipment, which includes a signal generator for providing a ramp signal representing desired acceleration and speed, that is compared to a signal representing the rate of rotation of the accessory equipment, resulting in a signal for controlling a control valve which in turn controls a clutch connected between the jet fuel starter and the accessory equipment.

It is still another object of the invention to provide an electronic circuit for controlling the acceleration and speed of jet engine accessory equipment wherein the speed of the accessory equipment is controlled by a clutch connected between the jet fuel starter and the accessory equipment.

It is still another object of the invention to provide an electronic circuit for controlling the acceleration and speed of jet engine accessory equipment wherein the speed of the accessory equipment is controlled by a clutch connected between the jet fuel starter and the accessory equipment, which in turn is controlled by a control valve that in turn responds to an error signal generated from a comparison of a slow ramp signal representing desired acceleration and speed limits as compared to signals representing the rate of rotation of the accessory equipment wherein an additional fast ramp signal is generated to initiate the engaging of the clutch to start the rotation of the accessory equipment and the slow ramp signal is utilized to maintain the acceleration and speed of the accessory equipment within the desired limits. In addition, another signal is provided the control circuit representing the exhaust gas temperature of the jet fuel starter to further regulate the clutch in the event of excessive exhaust gas temperatures.

In a typical jet aircraft, a jet fuel starter is connected through a starter clutch and a torque converter to the main jet engines. For example, a twin jet aircraft may have a mechanical drive train for selectively connecting the two main engines to the jet fuel starter wherein the drive train includes an isolation decoupler and an accessory drive train connected between the torque converter and each of the engines. In order to provide for electrical power generation by utilizing the jet fuel starter, one of the drive trains typically includes a manual disconnect mechanism inserted between the engine's accessory drive unit and the main engine. The starter clutch, and hence, the rate of rotation of the accessory equipment, is controlled by a servo-actuated control valve. In normal operation, the jet fuel starter will be within 90 per cent of its operating speed when the starter clutch is engaged to bring into operation the jet engine accessory equipment.

In order to limit the acceleration of the accessory equipment, an acceleration and speed control circuit is utilized to regulate the control valve. The acceleration and speed control circuit will respond to a "start" signal by causing the clutch to engage to a limited extent. A fast ramp generator provides a rapidly increasing signal which causes the pressure control valve to apply a fairly large pressure to the starter clutch, thus tending to engage the accessory equipment. When the accessory equipment begins to rotate, a magnetic pick-up unit will detect this fact and provide a signal to the acceleration and speed control circuit. This signal serves to discontinue the fast ramp signal and starts a slow ramp signal, which represents the desired acceleration of the accessory equipment. This slow ramp signal is compared to the actual rate of rotation of the accessory equipment measured by the MPU, and when the rate of rotation exceeds the limits on acceleration represented by the slow ramp signal, an error signal is generated, serving to reduce the pressure output of the pressure control valve, and thereby tending to decrease the rate of increase in rotation of the accessory equipment. The slow ramp signal is truncated with a maximum signal output which represents the desired speed of rotation of the accessory equipment. After the accessory equipment has reached the desired rate of rotation, an increase beyond this rate will cause the error signal to reduce pressure on the clutch, thereby reducing the rate of rotation of the accessory equipment in order to maintain the rate of rotation at the desired speed. By the same token, when the rate of rotation of the accessory equipment drops below the desired speed level, the error signal will increase the pressure on the starter clutch, resulting in an increase in rotation of the accessory equipment. The acceleration and speed control circuit is activated from a signal from the manual disconnect mechanism which indicates that the main engine has been disconnected from the accessory drive unit. As a result, the acceleration and speed control circuit only controls the starter clutch when the jet engine has been disconnected from the drive train. The acceleration and speed control circuit also responds to a signal representing the jet fuel starter's exhaust gas temperature and is effective to reduce the rate of rotation of the accessory equipment when the exhaust gas temperature exceeds predetermined limits.

DETAILED DESCRIPTION OF THE INVENTION

Figure 1:
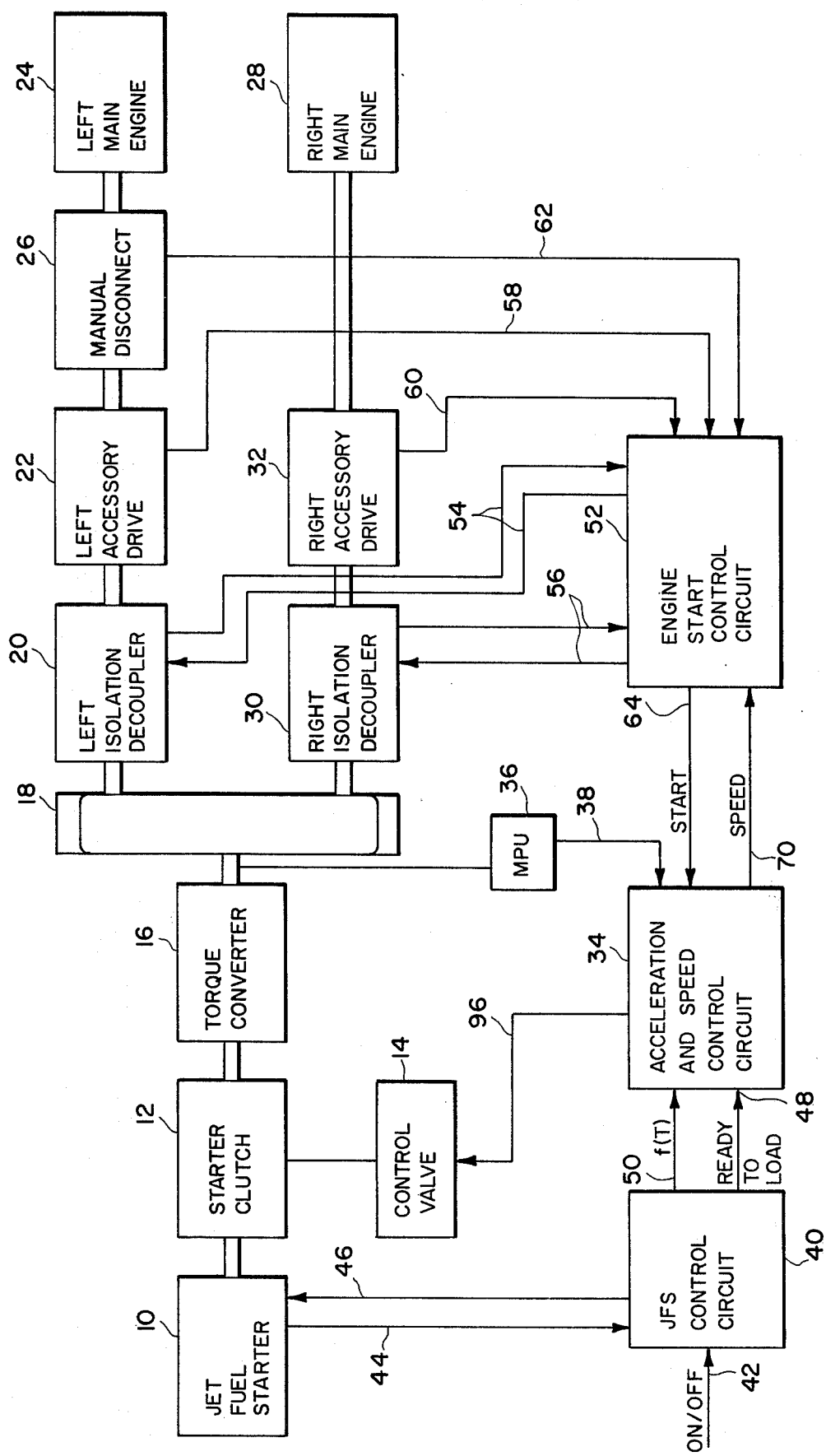
FIG. 1 is a block diagram of a jet engine start system.

A typical starting arrangement for a twin-engine jet aircraft is illustrated in the block diagram of FIG. 1. A jet fuel starter 10, which can be any one of a number of well-known jet fuel starter turbines, is mechanically connected to a starter clutch 12. The engagement of the starter clutch 12 is controlled by a servo control valve 14. Connected to the starter clutch is a torque converter 16, which in turn provides power to a gear box 18. Mechanical power is transferred from the gear box 18 through a left isolation decoupler 20 to a left accessory drive unit 22. The left main engine 24 is mechanically connected to the left accessory drive unit 22 through a manual disconnect mechanism 26. The right main jet engine 28 is similarly connected to the gear box 18 through a right isolation decoupler 30 and a right accessory drive unit 32. When it is desired to use the jet fuel starter 10 to produce electrical power for the aircraft in an auxiliary mode, the manual disconnect mechanism 26 will be utilized to disconnect the left main engine 24 from the left accessory drive unit 22. The left accessory drive unit 22 provides mechanical power to an aircraft generator (not shown) through a constant speed drive (not shown) or some other suitable device. When generating electrical power for the aircraft in an auxiliary mode, the right isolation decoupler serves to decouple the right main engine 28 from the gear box 18 so that only the left accessory drive unit will be connected to the jet fuel starter 10. In order to prevent damage to the accessory equipment being driven by the left accessory drive unit 22, an acceleration and speed control circuit 34 is utilized to regulate the control valve 14 and hence, the amount of power that is being applied from the jet fuel starter 10 to the left accessory drive unit 22. A magnetic pick-up unit 36 is utilized to measure the rate of rotation of the torque converter 16 output, which is proportional to the rate of rotation of the left accessory drive unit 22. The magnetic pick-up unit 36 generates a signal representing this rate of rotation and transmits it to the acceleration and speed control circuit 34 on line 38. The jet fuel starter 10 is controlled by a JFS control circuit 40, which in turn responds to an on/off signal on line 42. Information representing such quantities as compressor inlet temperature, exhaust gas temperature, the speed of rotation of the jet fuel starter, igniter signals and fuel valve signals is transmitted between the JFS control circuit 40 and the jet fuel starter 10 by means of lines 44 and 46. A ready-to-load signal is transmitted from the JFS control circuit 40 to the acceleration and speed control circuit 34 on line 48 and a jet fuel starter exhaust gas temperature signal $f(T)$ is transmitted from the JFS control circuit 40 to the acceleration and speed control circuit 34 on line 50. Included in the system of FIG. 1 is an engine start control circuit 52. One of the functions of the engine start control circuit is to control the left and right isolation decouplers 20 and 30, by means of signals transmitted over lines 54 and 56 respectively, so that the main engine selected for starting may be connected to the jet fuel starter 10. The engine start control circuit 52 also receives inputs from the left accessory drive unit 22 on line 58 and from the right accessory drive unit 32 over line 60, which indicate when the main engine being started has reached a predetermined speed. When the engine being started has reached a predetermined speed, the engine start control circuit will cause the appropriate isolation decoupler 20 or 30 to disconnect the engine from the jet fuel starter 10. A signal is also transmitted from the manual disconnect mechanism 26 over line 62 to the engine start control circuit indicating that the left main engine 24 has been disconnected from the left accessory drive unit 22. Thus, the engine start control circuit 52 contains logic for insuring proper main engine starts. During a main engine starting operation, a "start" signal will be transmitted from the engine start control circuit 52 on line 64 to the acceleration and speed control circuit 34 resulting in the control valve 14 engaging the starter clutch 12. When the engine 24 or 28 reaches the predetermined speed, a signal transmitted on line 58 or 60 will cause the engine start control circuit to disengage the appropriate isolation decoupler 20 or 30 and to place an "off" signal on line 64, thereby also disengaging the start clutch 12. A signal representing the speed of rotation of the torque converter 16 is also input to the engine start control circuit 52 from the acceleration and speed control circuit 34 by means of line 70.

Figure 2:
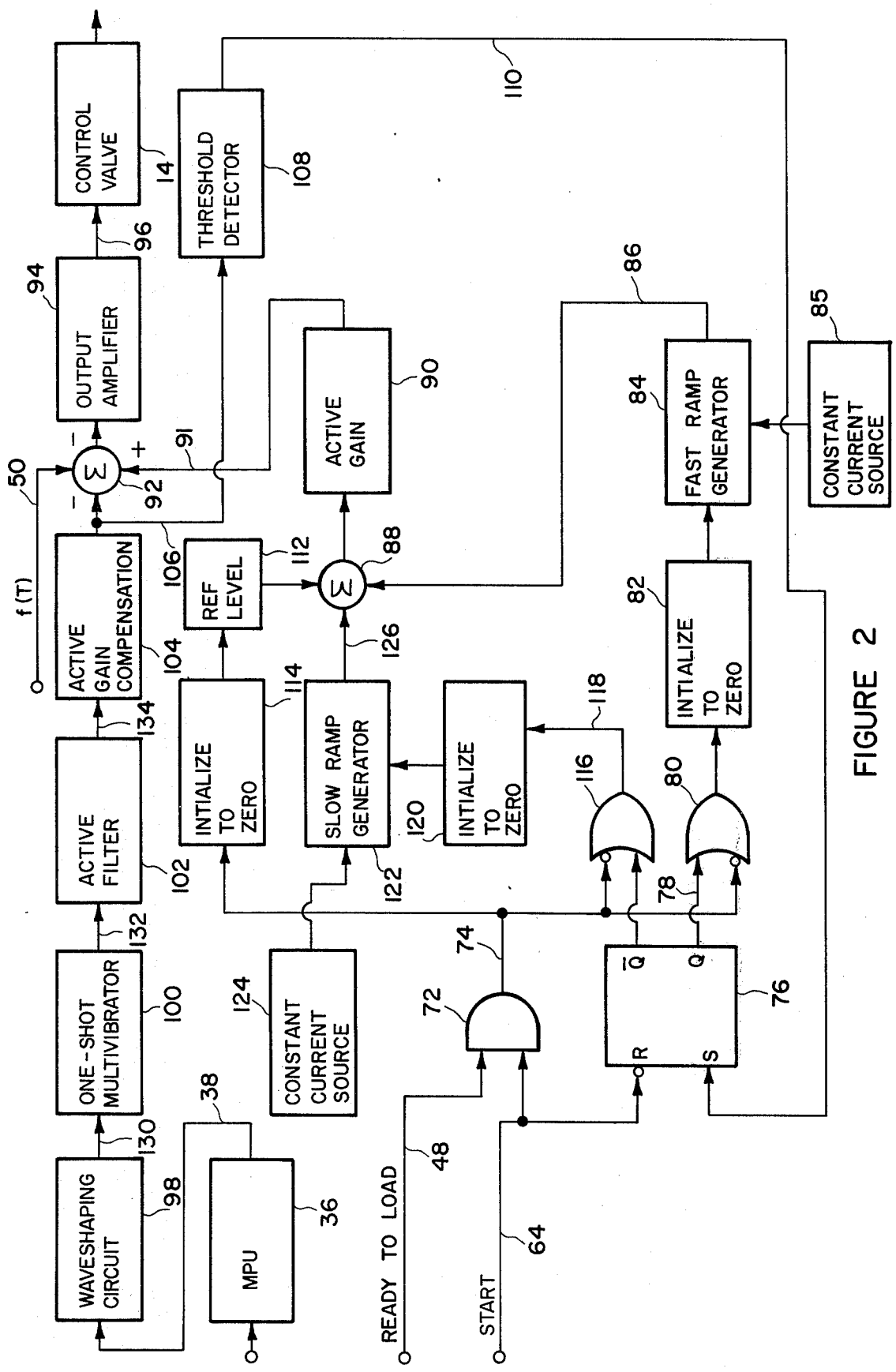
FIG. 2 is a block diagram of the acceleration and speed control circuit in FIG. 1.

Limiting the acceleration and the final speed of the left accessory drive unit 22 when the left main engine 24 has been disconnected from the left accessory drive 22 is primarily accomplished through the utilization of the acceleration and speed control circuit 34. The acceleration and speed control circuit 34 is illustrated in block diagram form in FIG. 2. When it is desired to use the jet fuel starter as a source of power for the left accessory drive unit 22, as, for example, generating power for aircraft when it is on the ground for maintenance purposes, a "ready-to-load" signal will be received from the JFS control unit 40 over line 48 and a start signal will be received from the engine start control circuit 52 over line 64. These signals indicate that the jet fuel starter 10 is turning at a predetermined rate of speed, such as 90 per cent of its rated rpm, and that the manual disconnect unit 26 has disconnected the left main engine 24 from the left accessory drive unit 22. The signals on lines 48 and 64 are applied to an AND gate 72 which in turn generates a high signal on line 74. The inversion of the start signal from the engine start control circuit 52 on line 64 also serves to reset a flip-flop 76 resulting in a low output from the Q terminal of the flip-flop on line 78. Since at this point the signal on line 74 is high and the signal on line 78 is low, the output of an OR gate 80 will be a low signal, which in turn serves to discontinue the functioning of an initialized to zero circuit 82. When the initialized to zero circuit 82 receives the low signal from OR gate 80 a fast ramp generator 84 will begin to generate a fast ramp signal on line 86. The fast ramp signal is transmitted over line 86 to a summing junction 88 which serves as input to an active gain amplifier circuit 90. A line 91 serves to transmit the amplified fast ramp signal from the active gain amplifier 90 to a second summing junction 92 which serves as an input to an output amplifier circuit 94. The output amplifier 94 amplifies the signal received from the summing junction 92 and provides a control signal over line 96 to the servo control valve 14. As illustrated in FIG. 1, the control valve 14 serves to control the extent to which the starter clutch 12 is engaged. As a result, as the fast ramp generator 84 generates the ramp signal, the control valve 14 applies sufficient pressure to the starter clutch 12 in order to engage the torque converter 16 with the jet fuel starter 10. The essential function of the fast ramp generator is to quickly pressurize the starter clutch 12 in order to start the torque converter 16 and ultimately the left accessory drive unit 22 turning.

As the torque converter begins to rotate, a signal will be generated in the magnetic pick-up unit 36 and transmitted through a wave-shaping circuit 98, a one-shot multi-vibrator 100, an active filter 102 and an active gain compensation circuit 104. The output of the active gain compensation circuit 104 on line 106 represents the rate of rotation of the torque converter output. When the output of the torque converter 16 begins to rotate, a threshold detector 108 generates a high signal on line 110. This high signal on line 110, utilized as input to the S input of flip-flop 76, serves to set the flip-flop 76. When the flip-flop 76 is set, the high output on the Q terminal is transmitted through OR gate 80 causing the initialized to zero circuitry to clamp or terminate the output of the fast ramp generator 84. Therefore, as soon as the torque converter begins to rotate, the output of the fast ramp generator will be terminated. Associated with the fast ramp generator 84 is a constant current source 85.

In order to prevent the starter clutch 12 from disengaging when the signal from the fast ramp generator 84 is terminated, a reference level voltage is applied to the summing junction 88 from a reference level voltage source 112. Prior to the starting sequence, the reference level voltage source 112 is maintained at a zero output by the initialized to zero circuit 114. At the same time the fast ramp generator 84 is activated, the high signal on line 74 will terminates the operation of the initialized to zero circuit 114 and switch on the reference level voltage from the reference level voltage source 112. The reference level voltage will tend to maintain the starter clutch in at least limited engagement immediately after termination of the fast ramp signal.

Figure 3:
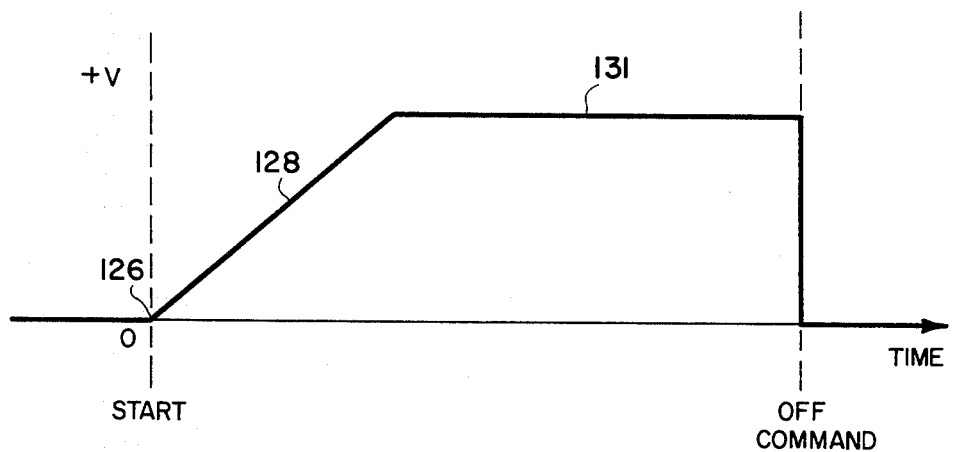
FIG. 3 is a graphical representation of the slow ramp generator output of the control circuit in FIG. 2.

With the detection of the beginning of rotation of the torque converter 16 by means of the signal on line 110 and the subsequent setting of the flip-flop 76, both inputs to a second OR gate 116 will combine to provide a low signal on line 118 thus serving to control another initialized to zero circuit 120. Prior to the beginning of rotation of the torque converter 16, the initialized to zero circuit 120 maintains the output of a slow ramp generator 122 at zero. Associated with the slow ramp generator 122 is a constant current source 124. With the setting of the flip-flop 76 the slow ramp generator 122 begins to generate a signal that represents the maximum acceleration rate for the accessory drive unit 22. The output of the slow ramp generator 122 is illustrated in the graph of FIG. 3 wherein the point 126 represents the setting of the flip-flop 76. The ramp portion 128 of the signal represents the maximum allowed acceleration for the left accessory drive unit 22 and might represent, in a typical installation, a maximum acceleration rate of 500 rpm/second for the accessories. The output of the slow ramp generator is also limited to a maximum value 130 which represents the maximum rate of rotation of the accessory drive unit 22. As in the case of the fast ramp generator, the output of the slow ramp generator on line 124 is input to the summing junction 88 which ultimately serves to control the pressure applied to the starter clutch 12 through the control valve 14. The greater the voltage output of the slow ramp generator, the greater the pressure output of the control valve 14 will be and hence, the greater the engagement of the starter clutch 12.

Figure 4:
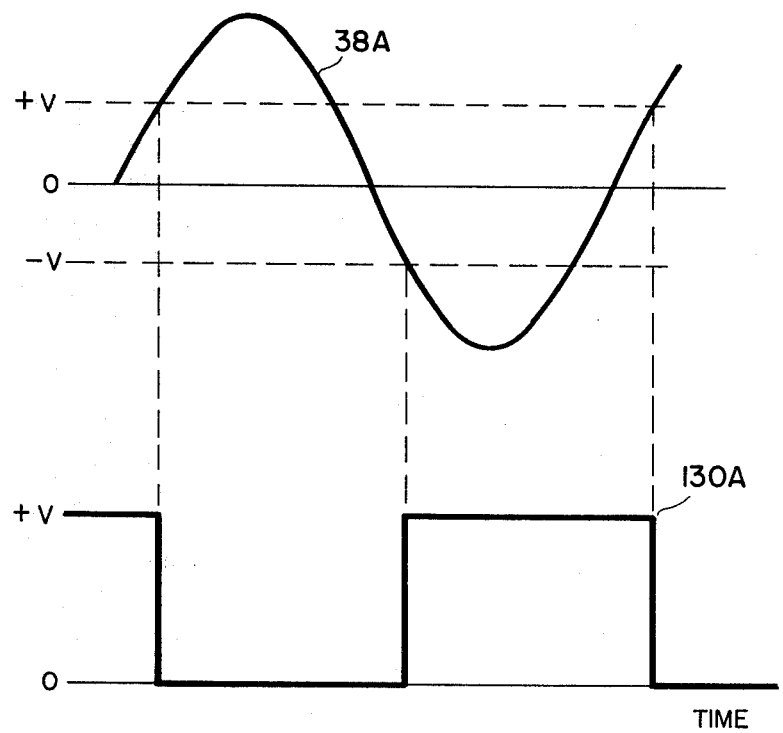
FIG. 4 is a graphical representation of the signal output of the wave shaping circuit of the control circuit in FIG. 2.
Figure 5:
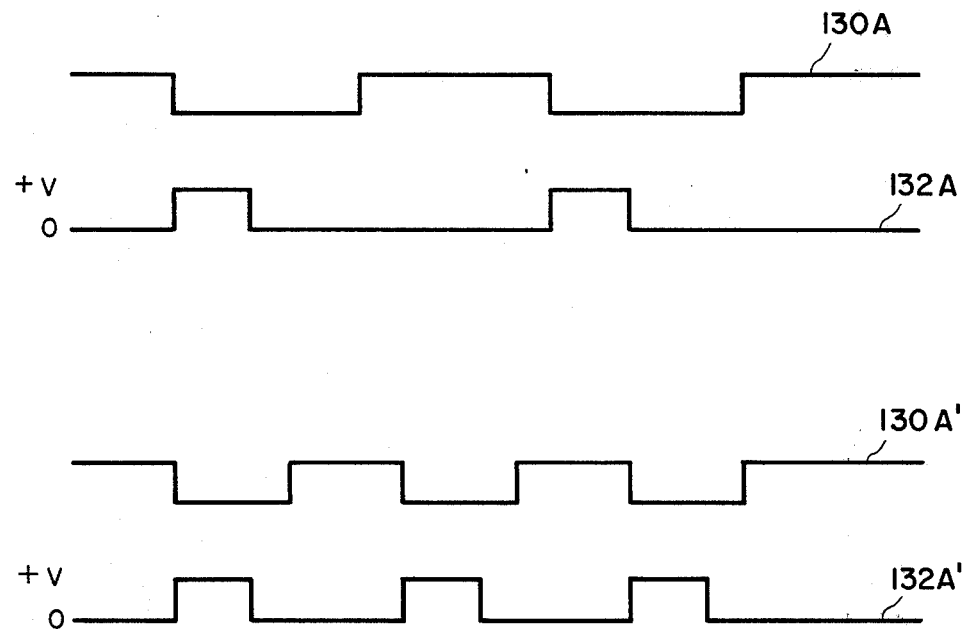
FIG. 5 is a graphical representation of the signal output of the one-shot multi-vibrator of the control circuit in FIG. 2.
Figure 6:
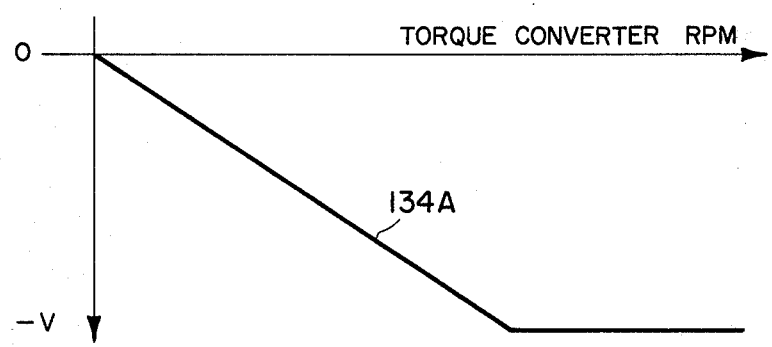
FIG. 6 is a graphical representation of the signal output of the active gain and compensation circuit of the control circuit in FIG. 2.

As indicated in FIG. 1 the magnetic pick-up unit 36 responds to the rotational output of the torque converter 16 by generating a signal. The output of the magnetic pick-up unit 36, which is in the nature of the sine wave, is received by the wave-shaping circuit 94 which converts this signal into a square wave. This process is illustrated in FIG. 4 where the output of the magnetic pick-up unit on line 38, illustrated by the signal 384 in the upper portion of the graph in FIG. 4, is converted to a square wave on line 130 by the wave-shaping circuit 98. As illustrated in FIG. 4, the square wave 130A will have a frequency proportional to the rate of rotation of the torque converter output and proportional to the rate of rotation of the left accessory drive unit 22. The square wave on line 130 is input to the one-shot multi-vibrator 100 which is triggered on the trailing edge of the square wave, producing a pulse of constant height and width each time it is triggered. Thus, the one-shot multi-vibrator 100 converts the rate of rotation of the torque converter output into a train of pulses the average of which is proportional to the speed of the left accessory drive unit 22. The operation of the one-shot multi-vibrator 100 is illustrated in FIG. 5 wherein the output of the wave-shaping circuit 98 on line 130 is illustrated by the signals 130A and 130A' and the output of the one-shot multi-vibrator on line 132 is illustrated by the square waves 132A and 132A'. The signals 130A' and 132A' represent a greater rate of rotation of the magnetic pick-up units 36 and hence, the torque converter output. From the one-shot multi-vibrator 100, the active filter 102 receives the square wave signal on line 132 and converts the square wave into a negative voltage representing the rate of rotation of the torque converter output. The output of the active filter 102 on line 134 is illustrated in FIG. 6 where the negative voltage (−V) increases with increasing torque converter output rpm. The signal 134A is utilized as input to the active gain and compensation circuit 104 which has an output representing the transfer function $$G(S) = K\frac{(S + T_1)}{(S + T_2)}$$

that provides the desired system response. The output of the active gain and compensation circuit 104 is then applied to the summing junction 92 which provides an error voltage output to the output amplifer 94. Thus, the output of the summing junction 92 will represent the difference between the actual speed of the torque converter output and the reference speed as represented by the signal output of the slow ramp generator 126. In addition, the summing junction 92 receives the $f(T)$ signal on line 50 which represents the exhaust gas temperature of the jet fuel starter 10. The signal $f(T)$ is a temperature-modulated signal which functions to decrease the load on the jet fuel starter 10 by causing the control valve 14 to decrease the pressure to the starter clutch 12 in the event that the exhaust temperature (biased by ambient temperature) of the jet fuel starter 10 should go above a predetermined value. Thus, the summing junction 92 serving as input to the amplifier 94 combines signals representing the desired accessory acceleration or speed, the actual accessory acceleration or speed, and a signal indicating the jet fuel starter exhaust gas temperature, and provides an error signal to the output amplifier 94.

Figure 7:
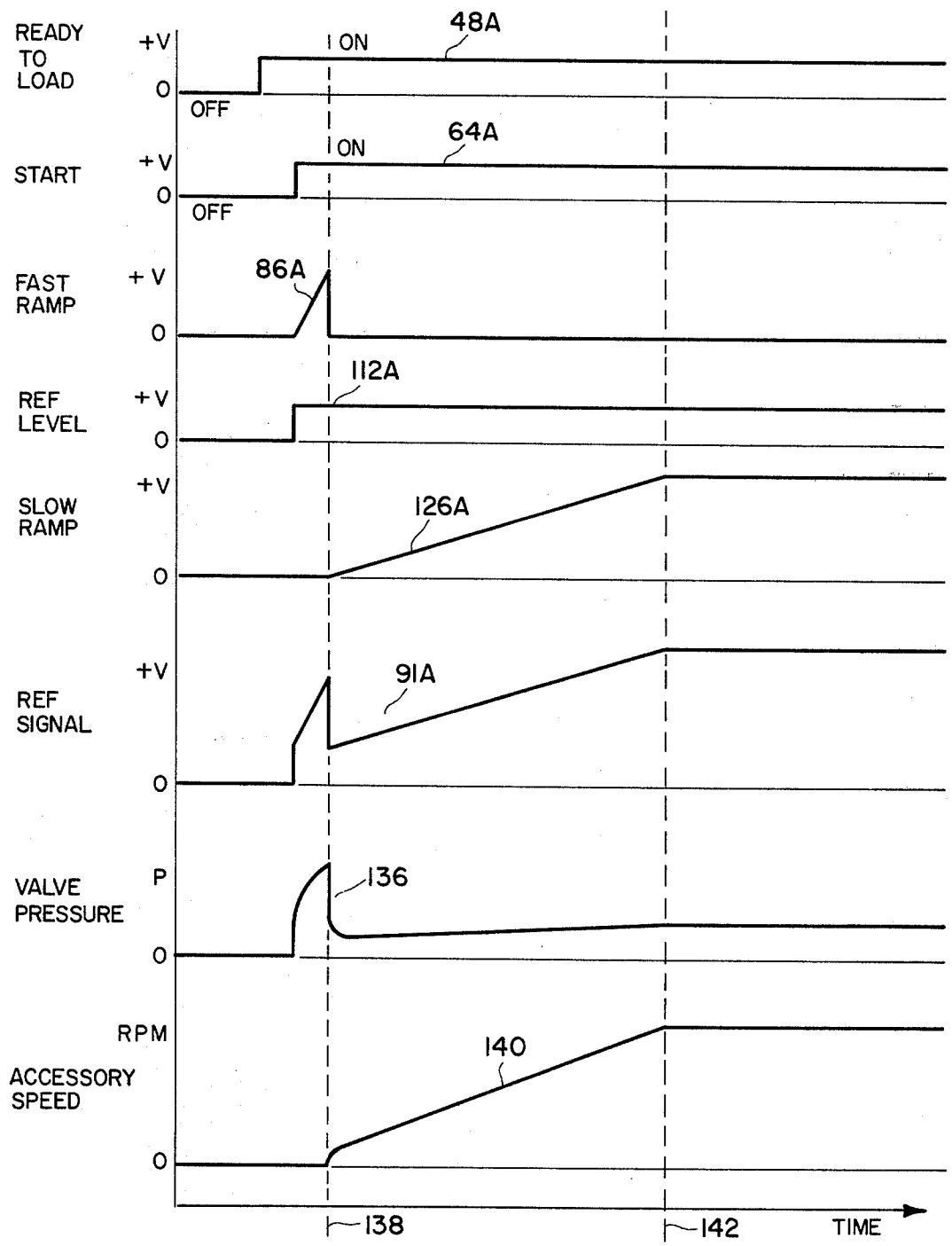
FIG. 7 is a timing chart for the control circuit in FIG. 2.

Operation of the acceleration and speed control circuit 134 is illustrated by the timing chart in FIG. 7. The ready-to-load signal on line 48 from the JFS control circuit 40 is illustrated by the wave form 48A. Normally, this signal indicates that the jet fuel starter is up to speed and therefore ready to load. After the ready-to-load signal 48A has gone high, a start signal 64A is transmitted on line 64 from the engine start control circuit to the acceleration and speed control circuit 34. When both 48A and 64A go high, the fast ramp generator will begin to generate the fast ramp signal 86A on line 86. At the same time, the reference level signal indicated by 112A will go high. The output of the active gain circuit 90 is shown by the signal indicated generally at 91A. As indicated by FIG. 7, the output of the active gain circuit 90 just after the initiation of the start signal 64A is the combination of the reference level signal 112A and the fast ramp signal 86A. The valve pressure, represented by the curve 136, increases with the reference signal 91A. As indicated before, the valve pressure actuates the starter clutch 12, tending to engage the clutch. At the time indicated by the dashed vertical line 138, the starting inertia of the torque converter, gear box 18, left isolation decoupler 20 and the left accessory drive unit 22 are overcome and the left accessory drive unit 22 begins to rotate as indicated by the curve 140. At this point in time, 138, the fast ramp signal 86A will be initialized to zero resulting in a reduction in the reference signal 91A and valve pressure 136. Also at this point in time, the slow ramp generator 122 begins to generate the ramp signal represented by 126A which is added to the reference level signal 112A to produce the reference signal 91A. Since the initial starting inertia has been overcome, the valve pressure 136 can be reduced while still allowing the accessory speed 140 to increase. When the slow ramp signal 126A has reached a value that represents the desired accessory speed at a time indicated by the dashed line 142, the accessory speed will have reached the desired level. Thereafter, the slow ramp signal 126A and hence the reference signal 91A will maintain a constant value for controlling the accessory speed 140.

I claim:

1. In a jet aircraft having at least one jet engine, a starter for starting the engines, and means for connecting the starter to the jet engine, a system for applying power to accessory equipment associated with a selected one of the jet engines from the starter comprising:
   means for disconnecting the accessory equipment from the selected engine in order to permit the accessory equipment to operate independently of the selected engine;
   means for controlling the starter;
   means for connecting the starter to the accessory equipment;
   means for measuring the speed of rotation of the accessory equipment;
   means, responsive to said starter controlling means and said speed measuring means, for limiting the acceleration of said accessory equipment when it is connected to the starter and disconnected from the engine wherein said acceleration limiting means includes an electronic circuit for generating a reference signal representing a predetermined rate of acceleration.

2. The system of claim 1 wherein said acceleration limiting means is operatively connected to said connecting means for controlling accessory acceleration.

3. The system of claim 2 wherein said connecting means includes a clutch operatively responsive to said acceleration limiting means for regulating the rate of rotation of the accessory equipment.

4. The system of claim 1 wherein said acceleration limiting means includes a circuit for comparing said reference signal with a signal from said speed measuring means representing the rate of rotation of the accessory equipment to generate an error signal for controlling said clutch.

5. The system of claim 4 wherein said acceleration limiting means additionally includes:
   an electronic circuit, responsive to said starter control means, for generating a signal to engage said clutch when the starter has reached a predetermined speed and when it is desired to activate the accessory equipment; and
   an electronic circuit, operatively responsive to said speed measuring means, for discontinuing said signal for engaging said clutch when the accessory equipment begins to rotate and for initiating said reference signal.

6. The system of claim 5 wherein said reference signal is a slow ramp signal with its slope representing acceleration.

7. The system of claim 6 wherein said signal for engaging said clutch is a fast ramp signal having a slope greater than said slow ramp signal.

8. In a jet aircraft having at least one jet engine, a starter for starting the engine, and a clutch mechanism for connecting the starter to each of the engines and associated accessory equipment, a system for applying power from the starter to accessory equipment associated with a selected one of the engines comprising:

means for mechanically disconnecting the accessory equipment from the selected engine in order to permit the accessory equipment to operate independently of the selected engine;

means for controlling the operation of the starter;

means for generating a signal representing the speed of rotation of the selected accessory equipment;

means for generating a slow ramp signal representing a predetermined rate of acceleration for the accessory equipment;

means for generating a fast ramp signal;

means for comparing said slow ramp signal and said fast ramp signal with said speed of rotation signal to generate an error signal;

means responsive to said error signal to control the engagement of the clutch thereby serving to regulate the accessory speed;

means, responsive to said starter control means and said disconnect means, to initiate said fast ramp signal when the accessory equipment has been disconnected from the selected engine and the starter has reached a predetermined speed; and means responsive to said rotational speed signal, to terminate said fast ramp signal and to initiate said slow ramp signal when the accessory equipment begins to rotate.

9. The system of claim 8 wherein said slow ramp signal generator means includes means for limiting said slow ramp signal to a predetermined value representing the desired operating speed of the accessory equipment.

10. The system of claim 9 additionally including a reference level signal source operatively connected to said comparing means effective to maintain a predetermined amount of clutch engagement when said fast ramp signal is terminated.

11. The system of claim 10 wherein said speed generating means includes:

a magnetic pick-up unit operatively connected to the output of the clutch;

an electronic circuit for converting the output of said magnetic pick-up unit into a square wave representing the speed of rotation of the accessory equipment; and a filter circuit for converting said square wave into a voltage representing the speed of rotation of accessory equipment.

12. In a jet aircraft having at least one jet engine, a jet fuel starter for starting the engines, a clutch mechanism for connecting the starter to the engine selected for starting along with the accessory equipment associated with the engine, a system for applying power from the starter to the accessory equipment associated with a selected one of the engines comprising:

means for mechanically disconnecting the accessory equipment from the selected engine in order to permit the accessory equpment to operate independently of the selected engine;

means for controlling the operation of the jet fuel starter and generating a signal representing the exhaust gas temperature of the starter;

a magnetic pick-up unit and associated circuitry operatively connected to the output of the clutch mechanism for generating a speed voltage;

a signal generator for generating a slow ramp signal representing a predetermined acceleration;

a signal generator for generating a fast ramp signal;

a comparator circuit for comparing said fast ramp signal and said slow ramp signal to said speed voltage and generating an error signal;

control means, responsive to said error signal, for controlling the engagement of the clutch mechanism and thereby the accessory speed; and a logic circuit, operatively connected to said starter controlling means, an engine start control circuit, said fast and slow ramp generators and said magnetic pick-up unit and associated circuitry for initiating said fast ramp signal in response to a ready-to-load signal from said starter control circuit and a start signal from said engine start control circuit and for terminating said fast ramp signal and initiating said slow ramp signal in response to a predetermined value of said speed voltage.

13. The system of claim 12 wherein said comparator circuit is responsive to said exhaust gas temperature signal and is thereby effective to reduce accessory speed when the exhaust gas temperature exceeds a predetermined value.

14. The system of claim 13 wherein said logic circuit includes a threshold detector responsive to said speed voltage to generate a threshold signal when the accessory equipment begins to rotate.

15. The system of claim 14 wherein said logic circuit includes a flip-flop responsive to said threshold signal and said start signal and operatively connected to both said fast and slow ramp generators, effective to start said fast ramp signal upon receipt of a start signal and effective to terminate said fast ramp signal and start said slow ramp signal upon receipt of a threshold signal.

16. The system of claim 15 additionally including a reference level voltage source operatively connected to said comparator circuit.

17. The system of claim 16 wherein said logic circuit includes an AND gate having as inputs said start signal and said ready-to-load signal and operatively connected to said reference level voltage source effective to apply said reference level voltage to said comparator circuit upon receipt of both of said signals.

18. The system of claim 17 wherein said logic circuit includes a first OR gate having as inputs a first signal from said flip-flop and the inverse of the signal output of said AND gate and operatively connected to said slow ramp generator.

19. The system of claim 18 wherein said logic circuit includes a second OR gate having as inputs a second signal from said flip-flop and the inverse of the output of said AND gate and operatively connected to said fast ramp generator.

20. The system of claim 3 wherein said connecting means additionally includes a torque converter operatively connected between said clutch and the accessory equipment.

21. The system of claim 20 wherein said speed measuring means is responsive to the rate of rotation of said torque converter output.

* * * * *